(12) United States Patent
Masaki et al.

(10) Patent No.: US 6,505,959 B2
(45) Date of Patent: Jan. 14, 2003

(54) DIRECTIONAL DIFFUSING FILM

(75) Inventors: Tadahiro Masaki, Tokyo-To (JP); Fumihiro Arakawa, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/839,691

(22) Filed: Apr. 23, 2001

(65) Prior Publication Data

US 2001/0046134 A1 Nov. 29, 2001

(30) Foreign Application Priority Data

Apr. 27, 2000 (JP) ........................................ 2000-127528

(51) Int. Cl.⁷ ................................................. F21V 5/02
(52) U.S. Cl. ........................... 362/339; 362/31; 349/64; 349/112; 264/167
(58) Field of Search ............................. 362/26, 27, 31, 362/337, 339; 349/64, 112; 359/599, 621, 622, 623, 624; 264/467, 167

(56) References Cited

U.S. PATENT DOCUMENTS 5,552,907 A * 9/1996 Yokota et al. .............. 349/112

* cited by examiner

*Primary Examiner*—Sandra O'Shea
*Assistant Examiner*—Guiyoung Lee
(74) *Attorney, Agent, or Firm*—Parkhurst & Wendel, L.L.P.

(57) ABSTRACT

A directional diffusing film of the invention includes a base film, and a plurality of convex directionality-providing elements regularly arranged on at least one surface of the base film. A section of a first directionality-providing element in a first plane including a top of the directionality-providing element has a shape of a substantially triangle, and a section of the directionality-providing element in a second plane including the top of the directionality-providing element and perpendicular to the first plane has a top of a second directionality-providing element and a shape of a continuous wave. The directional diffusing film having characteristics specified by the invention can diffuse light in proper directionally diffused light, while maintaining high light-diffusing ability. The directional diffusing film utilizes light highly efficiently as compared with conventional diffusing films.

11 Claims, 7 Drawing Sheets

DIRECTIONAL DIFFUSING FILM

TECHNICAL FIELD

The present invention relates to a directional diffusing film and, more particularly, to a directional diffusing film that can diffuse light in a controlled diffusion mode, a method of manufacturing the directional diffusing film, a surface light source unit and a liquid crystal display.

BACKGROUND ART

Generally, a surface light source unit is provided with a light diffusing film. The light diffusing film is disposed on a light-emitting side of the surface light source unit to diffuse illuminating light emitted by a light source of the surface light source unit.

A conventional light diffusing film is formed of a material prepared by dispersing a light diffusing matter such as organic or inorganic beads in a transparent resin base, or is formed by coating a transparent resin base with an ink containing a dispersing matter such as organic or inorganic beads.

FIG. 8 is a sectional view of a liquid crystal display 135 provided with an edge-type surface light source unit 120 as an example of a conventional surface light source unit employing a conventional light diffusing film.

As shown in FIG. 8, the surface light source unit 120 includes, as principal components, two light sources 121, a light guide plate 122, a reflecting film 124, and three light diffusing films 110-1, 110-2 and 110-3 that have the same parameters.

The light guide plate 122 is a surface light emitting means and has a light-emitting surface 122a, a not light-emitting surface opposite the light-emitting surface 122a, and opposite side surfaces. The light sources 121 are disposed beside the opposite side surfaces, respectively. A dot pattern 123 is formed on the not light-emitting surface in order to diffuse light emitted by the light sources 121 toward the light emitting surface 122a. The reflecting film 124 is disposed so as to face the not light-emitting surface of the light guide plate 122 to intercept light rays traveling in undesired directions and to reflect back the same in a predetermined direction.

The diffusing films 110-1, 110-2 and 110-3 disposed on the side of the light emitting surface 122a of the light guide plate 122 diffuse light emitted by the surface light source unit 120 to enhance the uniformity of light. The diffusing films 110-1, 110-2 and 110-3 conceal the dot pattern 123. A single diffusing film is unable to diffuse light satisfactorily and diffuses light irregularly. Usually, three diffusing plate or so are necessary to achieve satisfactory diffusion and to enhance front luminance.

A transparent liquid crystal display unit 133 is disposed on the light emitting side of the surface light source unit 120. The liquid crystal display unit 133 has a lower substrate 132, an upper substrate 131 and a liquid crystal layer 130 sandwiched between the substrates 131 and 132. In the liquid crystal display 135 shown in FIG. 8, the liquid crystal display unit 133 is illuminated from behind by the surface light source unit 120.

The light diffusing films included in the aforesaid conventional liquid crystal display contain beads as a diffusing matter. Therefore, light-diffusing characteristic of the light diffusing films is unsatisfactory if particle sizes of the beads are irregularly distributed or if the beads are dispersed unsatisfactorily in a base material of the light diffusing films or a coating material of the light diffusing films. In addition, it is difficult to maintain the light diffusing films in a satisfactory appearance. Furthermore, productivity (yield) in manufacturing the light diffusing films is low.

In addition, it is possible that the beads fall off edges of the light diffusing films when punching or cutting the light diffusing film into a desired size or when assembling the punched or cut light diffusing films, which can produce dust and foreign matters.

The beads diffuse light in all directions. Consequently, the amount of light can be reduced by internal absorption and some part of light can be reflected toward the light guide plate 122. Thus, the amount of light emitted in the normal (front) direction can be reduced, that is, efficiency of utilization of the light emitted by the light sources 121 may be low, and luminance of the surface light source unit 120 may be also low.

DISCLOSURE OF THE INVENTION

It is an object of the present invention to provide a directional diffusing film that can utilize light at a high efficiency and that can be produced at a high productivity free from producing dust and foreign matters, and a method of manufacturing such a directional diffusing film.

According to the present invention, a directional diffusing film includes a base film, and a plurality of convex directionality-providing elements regularly arranged on at least one surface of the base film; wherein a section of a first directionality-providing element in a first plane including a top of the directionality-providing element has a shape of a substantially triangle, and a section of the directionality-providing element in a second plane including the top of the directionality-providing element and perpendicular to the first plane has a top of a second directionality-providing element and a shape of a continuous wave.

The directional diffusing film having characteristics specified by the present invention can diffuse light in proper directionally diffused light, while maintaining high light-diffusing ability. The directional diffusing film utilizes light highly efficiently as compared with conventional diffusing films.

Preferably, the shape of the continuous wave is a periodic waveform having a period corresponding to each of the directionality-providing elements. For example, the periodic waveform may be a substantially sinusoidal waveform.

The shape of continuous wave may be a periodic waveform having wavy parts corresponding to the directionality-providing elements and straight parts respectively extending between the adjacent wavy parts.

Preferably, the section of the directionality-providing element in the first plane has a shape of a substantially isosceles triangle. Preferably, the substantially triangle has a vertex angle of a range of 80° to 100°. Preferably, the substantially triangle has a vertex which is rounded and/or a predetermined amount of which is cut off.

Preferably, the plurality of convex directionality-providing elements are arranged on a light emitting surface of the base film so that incident light of incident angles in a range of 70° to 80° leaves the directional diffusing film at outgoing angles including a maximum outgoing angle in a range of 25° to 40°. In the case, light that is difficult to be emitted out in prior art can be efficiently emitted out toward the front direction.

Preferably, the plurality of convex directionality-providing elements are arranged on a light emitting surface of the base film so that a haze value is in a range of 70 to 90 when light falls on a light receiving surface of the base film. Thus, luminous intensity (density) of diffused light in a necessary range can be increased.

According to the present invention, a method of manufacturing a directional diffusing film having the aforesaid characteristics comprises: a preparing step of preparing a cylinder having a molding pattern of a shape complementary to the plurality of convex directionality providing elements; and a molding step of molding the plurality of convex directionality providing elements by introducing a resin into the molding pattern of the cylinder.

According to the present invention, the directional diffusing film having the aforesaid characteristics can be manufactured at a manufacturing cost comparable to that of the conventional diffusing film. In addition, shape-repeatability and productivity are improved.

Preferably, the molding step includes: a step of introducing an ionizing radiation hardening resin into the molding pattern of the cylinder; and a step of setting the ionizing radiation hardening resin by irradiating ionizing radiation.

For example, the preparing step includes a step of forming the molding pattern of the shape complementary to the plurality of convex directionality providing elements by cell-engraving by means of an electronic engraving machine provided with a diamond stylus having a point angle in a range of 80° to 100°. Preferably, the diamond stylus has a tip that is rounded and /or cut by a predetermined amount.

In addition, this invention is a surface light unit comprising: a light source, a surface light emitting means having a light-emitting surface that can emit a light from the light source in a predetermined direction, and a directional diffusing film that includes a base film, and a plurality of convex directionality-providing elements regularly arranged on at least one surface of the base film, wherein a section of a first directionality-providing element in a first plane including a top of the directionality-providing element has a shape of a substantially triangle, and a section of the directionality-providing element in a second plane including the top of the directionality-providing element and perpendicular to the first plane has a top of a second directionality-providing element and a shape of a continuous wave.

Alternately, this invention is a liquid crystal display comprising: a light source, a surface light emitting means having a light-emitting surface that can emit a light from the light source in a predetermined direction, a directional diffusing film that includes a base film, and a plurality of convex directionality-providing elements regularly arranged on at least one surface of the base film, and a transparent liquid-crystal element arranged on a light-emitting side of the directional diffusing film, wherein a section of a first directionality-providing element in a first plane including a top of the directionality-providing element has a shape of a substantially triangle, and a section of the directionality-providing element in a second plane including the top of the directionality-providing element and perpendicular to the first plane has a top of a second directionality-providing element and a shape of a continuous wave.

The surface light source unit and the liquid crystal display are able to enhance luminance efficiently in a practical range of luminance, and the liquid crystal display is also capable of clearly displaying images or the like, even if the number of the directional diffusing films is small. The surface light source unit and the liquid crystal display can be formed in smaller thicknesses and can be sold at lower prices, respectively.

BEST MODE FOR CARRYING OUT THE INVENTION

Preferred embodiments of the present invention will be described with reference to the accompanying drawings.

Directional Diffusing Film

Figure 1A:
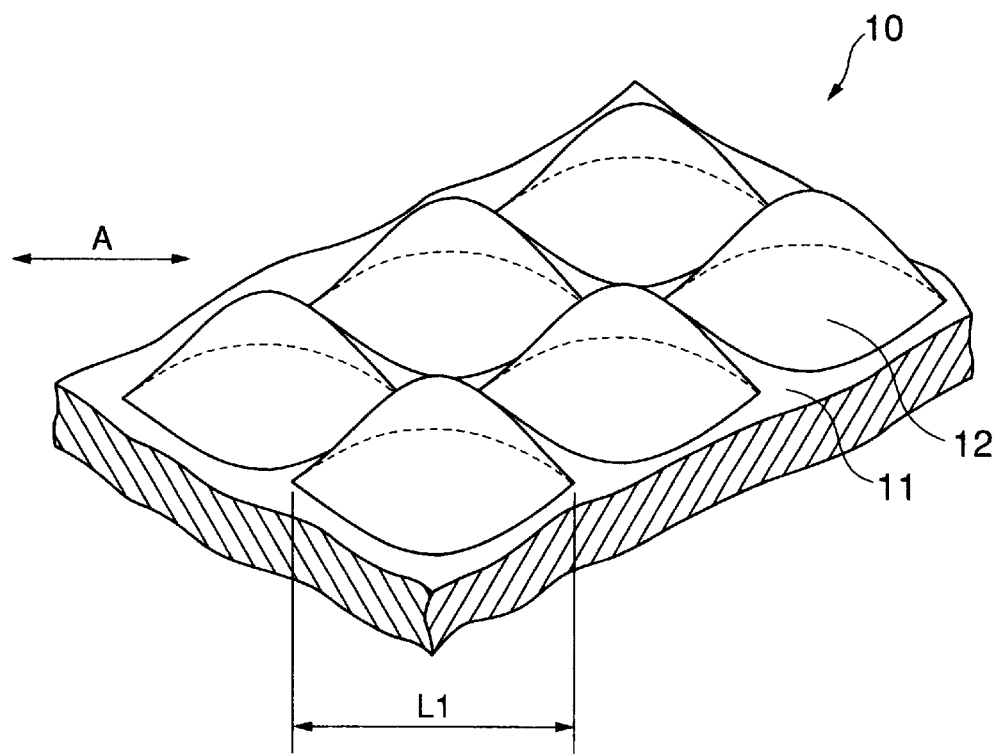
FIG. 1A is an enlarged, fragmentary perspective view of a directional diffusing film in a preferred embodiment according to the present invention.
Figure 1B:
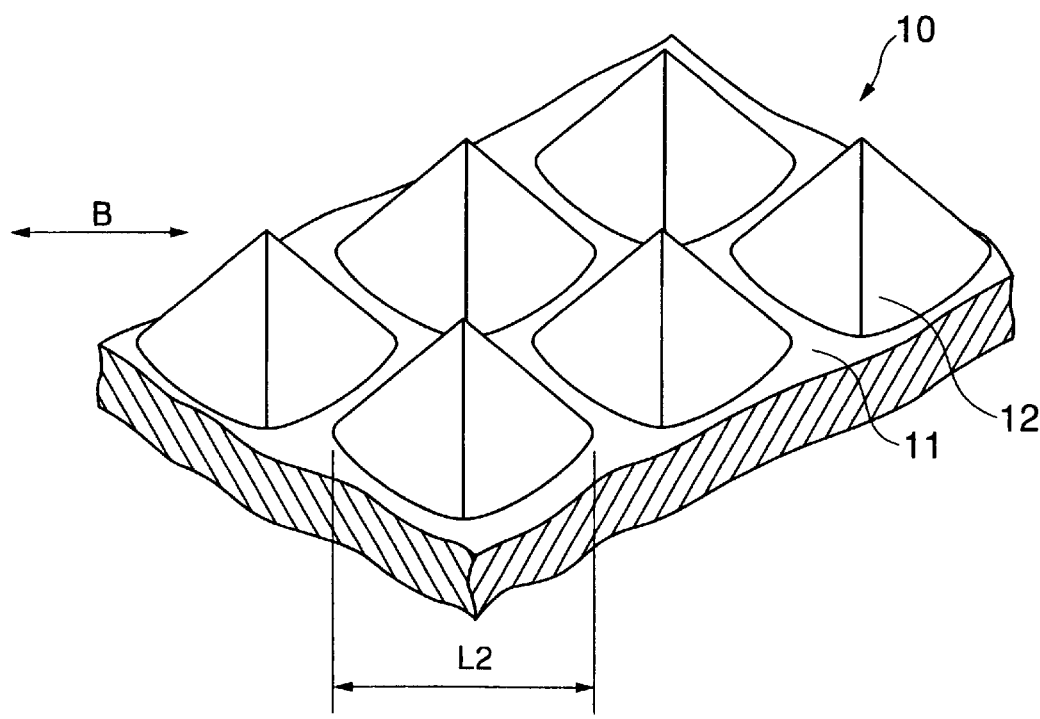
FIG. 1B is an enlarged, fragmentary perspective view of the directional diffusing film of FIG. 1A as seen in a direction of an arrow A in FIG. 1A.

FIG. 1 is an enlarged, fragmentary perspective view of a directional diffusing film 10 in a preferred embodiment according to the present invention. FIG. 1A is a perspective view seen in a direction of an arrow B in FIG. 1B, and FIG. 1B is a perspective view seen in a direction of an arrow A in FIG. 1A.

The directional diffusing film 10 has a base film 11 and a plurality of directionality-providing elements 12. In FIG. 1, the directionality-providing elements 12 are magnified greatly for exaggeration. Actually, the convex directionality-providing elements 12 are very small projections.

The base film 11 is formed of a transparent resin. The base film 11 may be an oriented or nonoriented film of a thermoplastic resin, such as cellulose triacetate, a polyester, polyamide, polyimide, polypropylene, poly(methyl pentene), poly(vinyl chloride), poly(vinyl aceta), poly (methyl methacrylate), polycarbonate or polyurethane. Although dependent on rigidity, it is preferable that a thickness of the base film 11 is in a range of 50 to 200 μm, from a viewpoint of processing and/or handling it. In addition, in view of firmly and stably bonding the convex directionality-providing elements 12 to the base film 11, it is preferable to finish a surface of the base film 11 to which the convex directionality-providing elements 12 are to be bonded, by an adhesion improving process such as a corona discharge process.

Figures 2A, 2C:
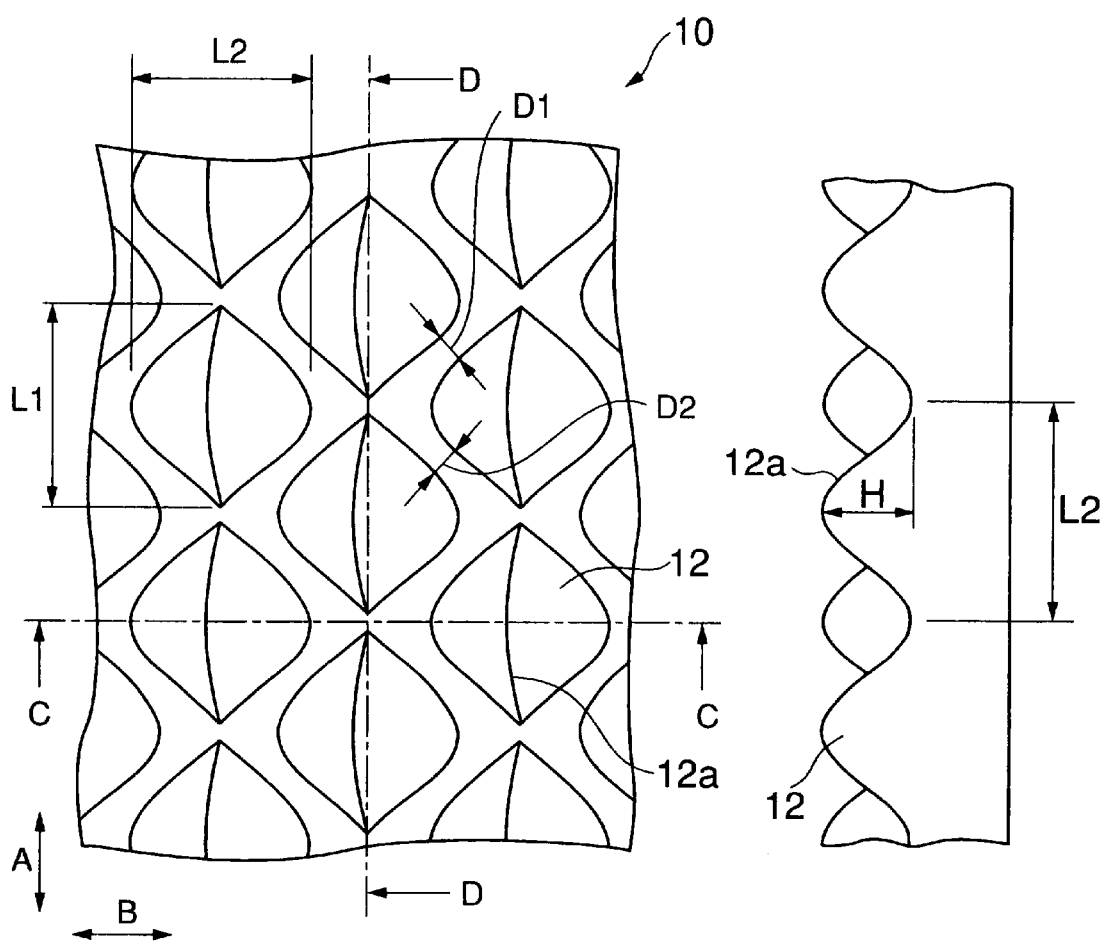
FIG. 2A is a schematic plan view of the directional diffusing film in the preferred embodiment.
FIG. 2C is a schematic sectional view taken along the line D—D (second plane) in FIG. 2A.
Figure 2B:
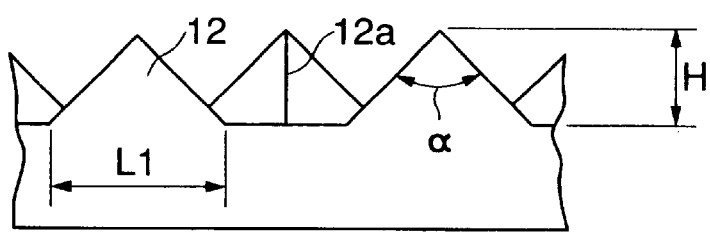
FIG. 2B is a schematic sectional view taken along the line C—C (first plane) in FIG. 2A.

FIGS. 2A, 2B and 2C are a plan view and sectional views of the directional diffusing film 10. FIG. 2A is a plan view taken from the side of the light emitting surface of the directional diffusing film 10, FIG. 2B shows a section CC included in a first plane and extending in the direction of the arrow B, and FIG. 2C is a section DD included in a second plane and extending in the direction of the arrow A. As shown in FIG. 2C, an outline 12a of the section DD of the convex directionality-providing elements 12 included in the second plane is gently curved. The outline 12a of the section DD of the convex directionality-providing elements 12 may have straight lines dependently on a method and/or a condition for forming a molding cylinder 88.

As shown in FIG. 2B, the outline of the section CC of the convex directionality-providing elements 12 included in the first plane and extending in the direction of the arrow B has a shape of isosceles triangles each having a vertex angle $\alpha=90°$. The first plane including the section CC includes tops of the convex directionality-providing elements 12. Shapes of sections of the convex directionality-providing elements 12 included in planes parallel to the first plane and not including the tops of the convex directionality-providing elements 12 are substantially similar to and lower than the shape of the section CC of the convex directionality-providing elements 12 included in the first plane and extending in the direction of the arrow B.

The shape of the section CC of the convex directionality-providing elements 12 included in the first plane and extending in the direction of the arrow B does not need to be that of isosceles triangles and may be that of any triangles other than isosceles triangles.

The outline 12a of the section DD included in the second plane including the tops of the convex directionality-providing elements 12 has a sinusoidal waveform. A three-dimensional shape of the convex directionality-providing elements 12 is followed by moving the section CC of isosceles triangles extending in the direction of the arrow B along the substantially sinusoidal waveform.

Referring to FIGS. 2A, 2B and 2C, each of the convex directionality-providing elements 12 has a vertex angle a in a range of 80° to 100°, a height H in a range of 15 to 120 $\mu$m and lengths L1 and L2 of the bottom in a range of 40 to 200 $\mu$m. Spaces D1 and D2 between adjacent convex directionality-providing elements 12 are 15 $\mu$m or below, respectively. Thus, the convex directionality-providing elements 12 are arranged in the highest possible density. The values of the parameters L1, L2 and H are determined dependently on operating conditions of the electronic engraving machine, which will be described later. If the vertex angle $\alpha$ is outside the aforesaid range, front luminance is greatly reduced.

In the directional diffusing film 10 shown in FIG. 2, the length L1 and L2 are approximately equal to each other. However, the lengths L1 and L2 need not be equal to each other and may be of any suitable values, respectively.

The tops of the convex directionality-providing elements 12 may be rounded and/or cut by a predetermined amount. However, luminance tends to be reduced when the tops are rounded and/or cut by a predetermined amount.

The convex directionality-providing elements 12 are formed of a mixture of an oligomer, such as (meth)acrylate (hereinafter acrylate and methacrylate will be referred to inclusively as "(meth)acrylate" of a polyfunctional compound, such as any polyhydric alcohol, or a prepolymer, and a comparatively large amount of a reactive diluent. Suitable diluents include monofunctional monomers, such as ethyl (meth)acrylate, ethylhexyl (meth)acrylate, styrene, vinyltoluene and N-vinylpyrrolidone, and multifunctional monomers, such as trimethylolpropane tri(meth)acrylate, hexanediol (meth) acrylate, tripropylene glycol di (meth) acrylate, diethylene glycol di(meth)acrylate pentaerythritol tri(meth)acrylate, dipentaerythritol hexa(meth)acrylate, 1,6 hexane diol (meth)acrylate and neopentyl glycol di(meth) acrylate.

When the aforesaid mixture contains a photopolymerization initiator, such as acetophenone, benzophenoe, Michler's benzoyl benzoate, $\alpha$-amyloxime ester or thioxanthone, and a photosensitizer, such as n-butylamine, triethylamine or tri-n-butylphosphine, the same can be used as an ultraviolet hardening resin.

The mixture may contain, as an ionizing radiation hardening resin, an active organic silicon compound expressed by $R_mSi(OR')_n$, where R' is an alkyl group having a carbon number in a range of 1 to 10, and m and n are integers meeting m+n=4. Concretely, the organic silicon compound may be tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxy-silane, tetrapenta-n-butoxysilane, tetrapenta-sec-butoxysilane, tetrapenta-tert-butoxysilane, methyl trimethoxysilane, methyl triethoxysilane, methyl tripropoxysilane, methyl tributoxysilane, dimethyl dimethoxysilaane, dimethyl diethoxysilane, dimethyl ethoxysilane, dimethyl methoxysilane, dimethyl propoxysilane, dimethyl butoxysilane, methyl dimethoxysilane, methyl diethoxysilane, or hexyl trimethoxysilane.

The convex directionality-providing elements 12 may be formed of a thermoplastic resin instead of the aforesaid reaction hardening resin. Possible thermoplastic resins are, for instance, acrylic resins, such as methyl methacrylate and ethyl methacrylate, polyester resins, such as polyethylene terephthalate, polybutylene terephthalate and polyethylene naphthalate, polycarbonate resins, polyhydrocarbon resins, such as polystyrene, polypropylene and polymethylpentene, polyamide resins, such as nylon 66 and nylon 6, saponified ethylene-vinyl acetate copolymers, polyimide resins, polysulfone resins, polyvinyl chloride resins, and cellulose acetate resins.

In this embodiment, the base film 11 and the convex directionality-providing elements 12 are formed of the following materials.

The base film 11 is a PET film with a thickness t=100 $\mu$m (A4300, commercially available from Toyobo).

The convex directionality-providing elements 12 are formed of an ultraviolet hardening resin (RC19-793, commercially available from Dai Nippon Inki Kagaku Kogyo K.K.).

Method of Manufacturing Directional Diffusing Film

The directional diffusing film 10 was made by forming the convex directionality-providing elements 12 on the base film 11.

Figure 3:
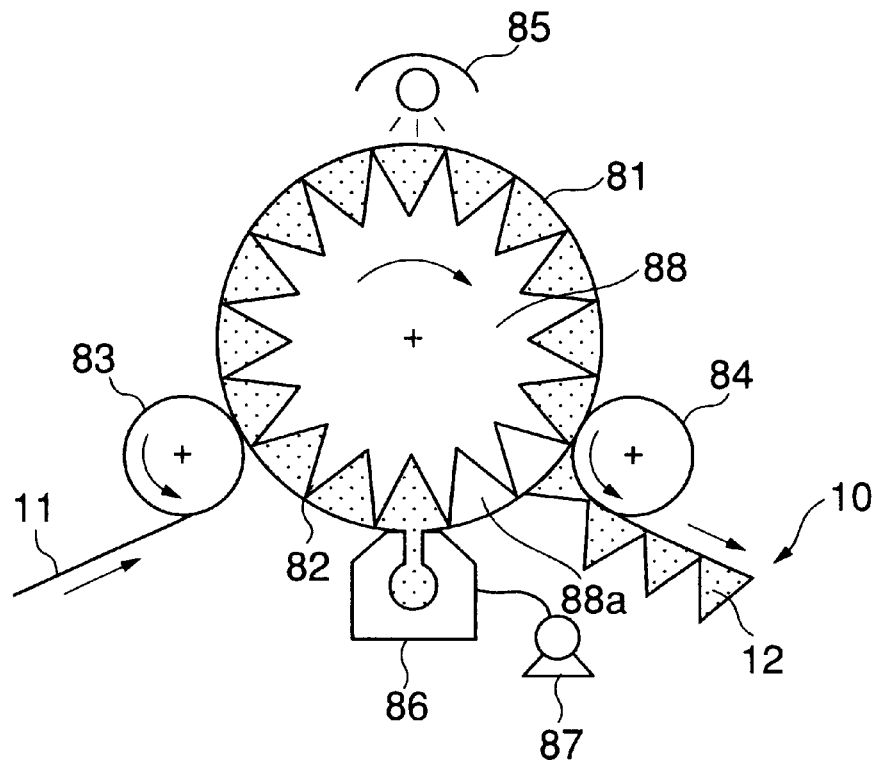
FIG. 3 is a schematic view for explaining steps of forming convex directionality-providing elements included in the directional diffusing film of the embodiment.

Referring to FIG. 3, the molding cylinder 88 is provided in its circumference with cavities (a concave pattern) 88a having a shape complementary to that of the convex directionality-providing elements 12, in a regular arrangement corresponding to that of the convex directionality-providing elements 12 of the directional diffusing film 10. An ionizing radiation hardening resin 82 is fed to a die head 86 by a pump 87 and is extruded through the die head 86 evenly into the cavities 88a. The base film 11 is pressed closely against the circumference of the molding cylinder 88 by means of an inlet nip roller 83. The ionizing radiation hardening resin 82 filling up the cavities 88a is irradiated through the base film 11 with ionizing radiation radiated by an ionizing radiation irradiation unit 85 (D-valve UV lamp, commercially available from Fusion) to set the ionizing radiation hardening resin 82 into a cured (set) resin 81 and to bond the cured resin 81 to the base film 11. Then, the convex directionality-providing elements 12 integrally combined with the base film 11 are separated from the molding cylinder 88 by means of an outlet nip roller 84 in order to obtain the directional diffusing film 10.

Figure 4:
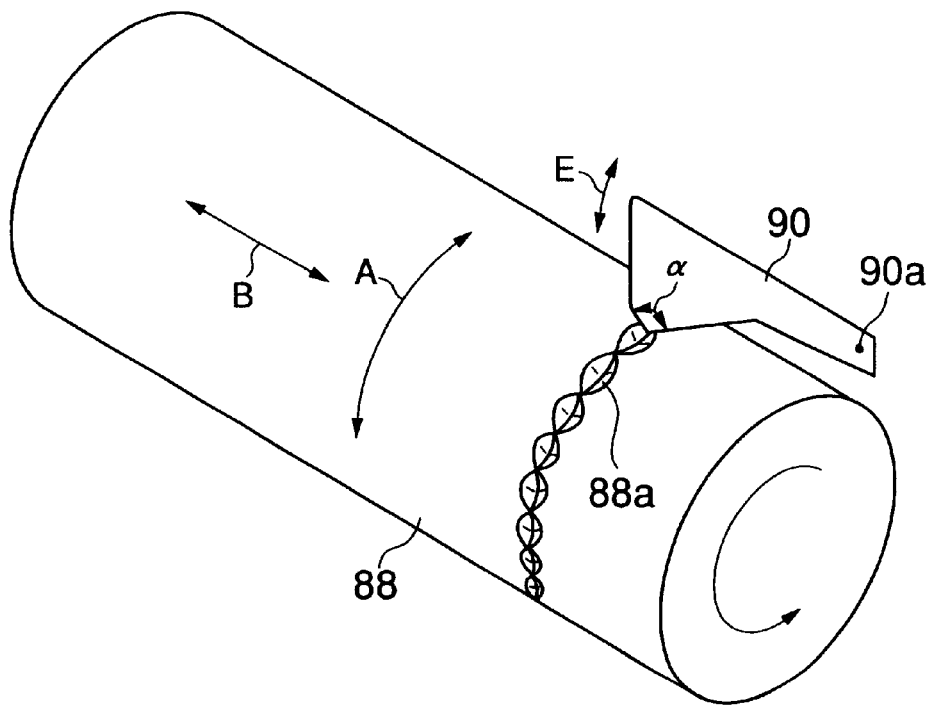
FIG. 4 is a schematic view for explaining a method of forming a concave pattern in a circumference of a cylinder.

FIG. 4 is a view of assistance in explaining a method of forming the cavities 88a in the circumference of the molding cylinder 88 in an arrangement corresponding to the regular arrangement of the convex directionality-providing elements 12. In FIG. 4, directions indicated by arrows A and B correspond to those indicated by arrows A and B in FIGS. 1 and 2, respectively.

The cavities 88a were formed by a cell-engraving process using a gravure electronic engraving machine (commercially available from Heidelberg Japan) provided with a double-negative diamond stylus having a point angle α=90°.

A diamond stylus 90 is supported on a fulcrum 90a for minute oscillation at a frequency of the order of several thousands hertz. An amplitude of the minute oscillation is controlled according to a rotating speed of the molding cylinder 88 in such a manner that the amplitude traces a substantially sinusoidal waveform. Thus, the cavities 88a are formed correspondingly to the convex directionality-providing elements 12 arranged in a substantially sinusoidal waveform. In the embodiment, the tip of the diamond stylus 90 was cut by 5 μm beforehand in order to prevent breakage thereof during the engraving process. The cavities 88a were formed on the molding cylinder 88 in 100 lines/cm and at an angle of 4°.

Surface Light Source Unit and Liquid Crystal Display

Figure 5:
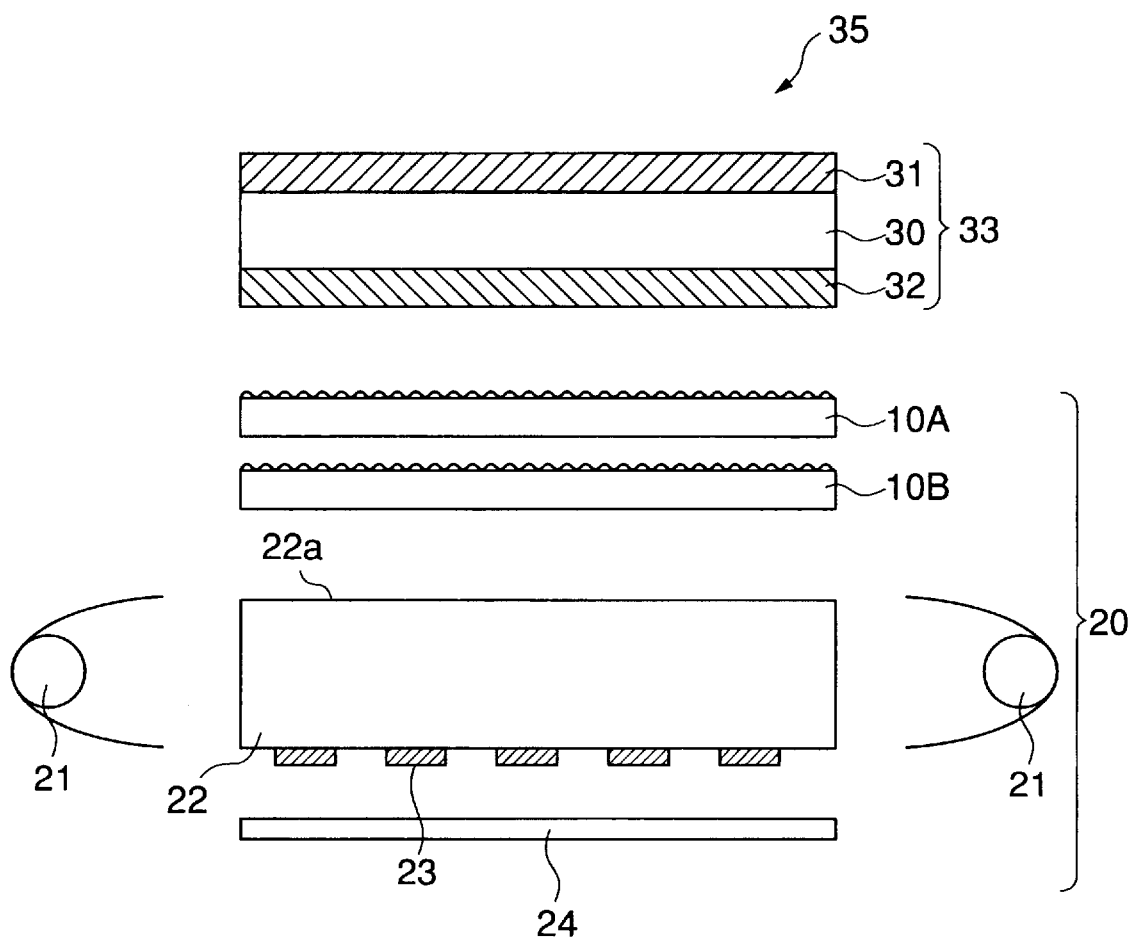
FIG. 5 is a schematic sectional view of a liquid crystal display provided with a surface light source unit employing directional diffusing films of the embodiment.

FIG. 5 is a sectional view of a liquid crystal display 35 provided with a surface light source unit 20 employing the directional diffusing films 10 of the embodiment.

As shown in FIG. 5, the surface light source unit 20 includes two light sources 21, a light guide plate 22, a reflecting film 24 and two directional diffusing films 10A and 10B. The directional diffusing films 10A and 10B are the foregoing directional diffusing films 10 and have the same parameters. The directional diffusing films 10A and 10B are disposed in such a manner that four sides of each bottom of the convex directionality-providing elements 12 thereof (FIG. 2) extend at an angle of about 45° respectively with respect to four sides of a light emitting surface 22a of the rectangular light guide plate 22 (with respect to a direction perpendicular to the lamp and a direction parallel to the lamp).

The light guide plate 22, i.e., a surface light projecting means, has the light-emitting surface 22a, a not light-emitting surface opposite the light-emitting surface 22a, and opposite side surfaces. The light sources 21 are disposed near the opposite side surfaces, respectively. The not light-emitting surface is provided with a dot pattern 23 in order to diffuse light emitted by the light sources 21 toward the light emitting surface 22a. The reflecting film 24 faces the not light-emitting surface of the light guide plate 22 to intercept light rays traveling in unnecessary directions and to reflect back the light rays in a predetermined direction.

A transparent liquid crystal display unit 33 is disposed on the light emitting side of the surface light source unit 20. The liquid crystal display unit 33 includes a lower substrate 32, an upper substrate 31, and a liquid crystal layer 30 sandwiched between the upper substrate 31 and the lower substrate 32. As shown in FIG. 5, the surface light source unit 20 illuminates the liquid crystal display unit 33 from the back side of the same.

Performance Evaluation Tests

The directional diffusing film 10 and the surface light source unit 20 including the directional diffusing film 10 were evaluated in terms of front luminance, particle falling, and luminous intensity distribution in comparison with a conventional directional diffusing film and a conventional surface light source unit including the conventional directional diffusing film.

Figure 8:
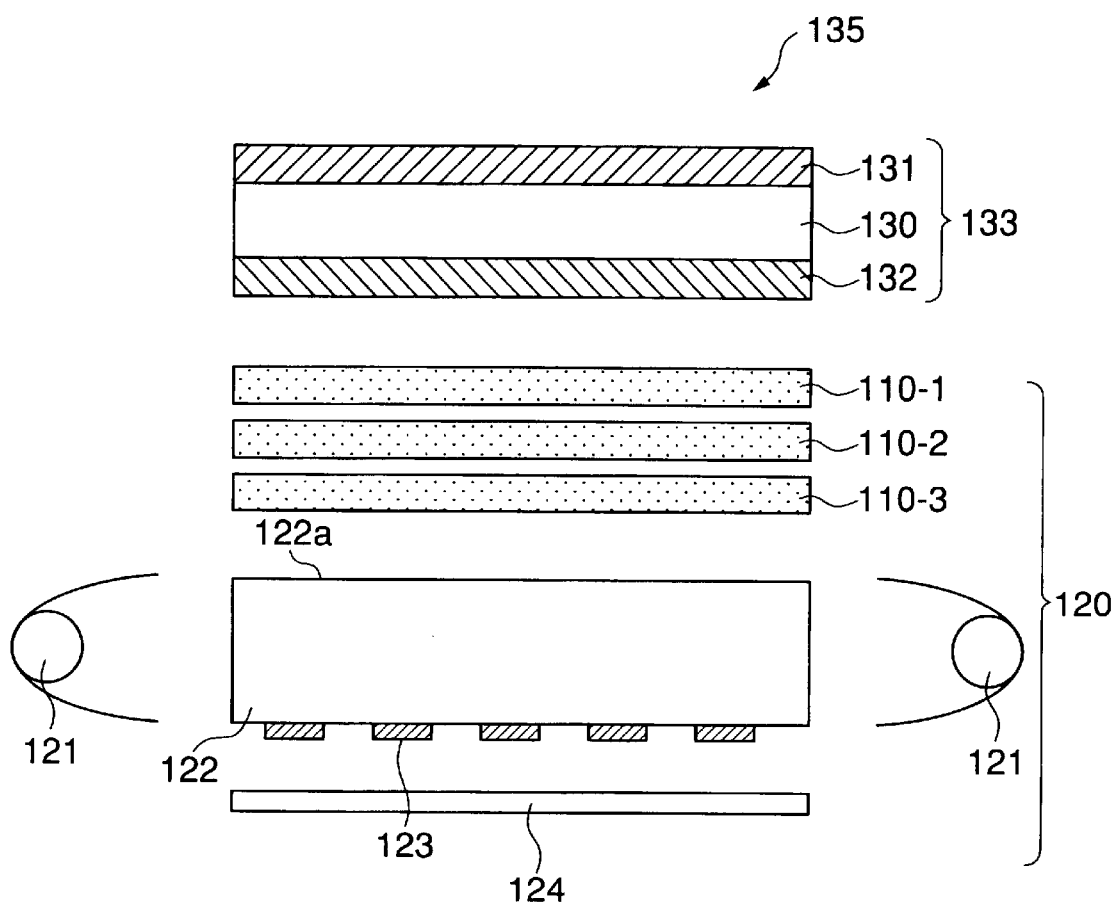
FIG. 8 is a schematic sectional view of a liquid crystal display provided with a surface light source unit employing conventional light diffusing films.

Herein, the conventional surface light source (comparative example) is the surface light source unit 120 explained in connection with FIG. 8, which employs directional diffusing films D121 commercially available from Tujiden as the conventional directional diffusing films 110-1, 110-2 and 110-3.

A haze value, which is a ratio of luminance of an object as observed through a diffusing medium to that of the object as observed directly, was used as an index of a level of light diffusion. The directional diffusing film 10 of the embodiment had a satisfactory haze value in the range of 70 to 90.

More concretely, the light sources 21 and 121 were turned on and the front luminances of the surface light source units 20 and 120 were measured from a direction normal to the front surfaces of the respective surface light source units 20 and 120 by a luminance meter (BM-7, angle of field: 2°, made by Topcon).

Particle falling was evaluated by the number of foreign matters found when cutting the directional diffusing films in a predetermined size and incorporating the cut films into the surface light source units.

Results of measurement of the front luminance and particle falling are shown in Table 1.

TABLE 1

| | FRONT LUMINANCE | PARTICLE FALLING |
| --- | --- | --- |
| EMBODIMENT | 1495 cd/m$^2$ (102.1%) | ◯ (NOT FOUND) |
| COMPARATIVE | 1465 cd/m$^2$ (100.0%) | X (FOUND) |

The front luminance of the surface light source unit of the embodiment was greater than that of the comparative example by about 2%. In addition, as resin fragments and fine particles fell from the comparative example, but nothing fell at all from the surface light source unit of the embodiment.

Luminous intensities of the surface light source units 20 and 120 with respect to two perpendicular directions were measured in the angular range of −80° to 80° at angular intervals of 1° by the luminance meter (BM-7, angle of field: 20, made by Topcon)

Figure 6:
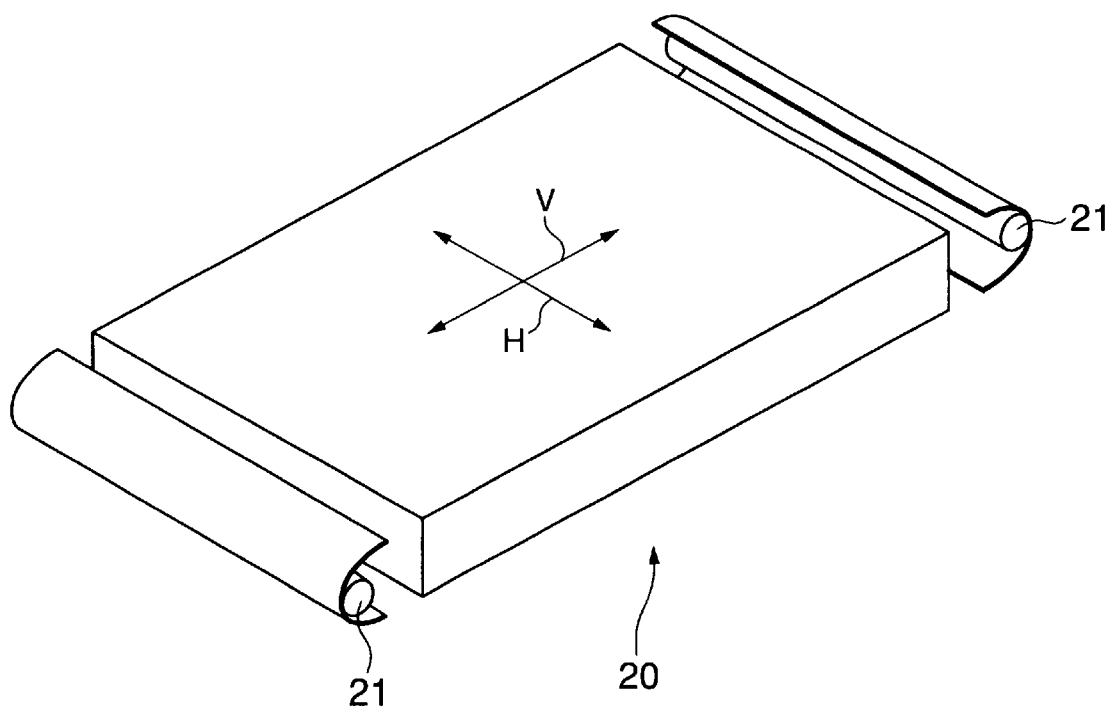
FIG. 6 is a perspective view for explaining directions for measurements of luminous intensity distribution.

FIG. 6 shows the directions for the measurement of luminous intensity distribution characteristics. In FIG. 6, a vertical direction perpendicular to the respective light sources (lamps) 21 is indicated by an arrow V and a horizontal direction perpendicular to the vertical direction is indicted by an arrow H. Luminous intensity distribution characteristics were measured with respect to those two directions.

Figure 7A:
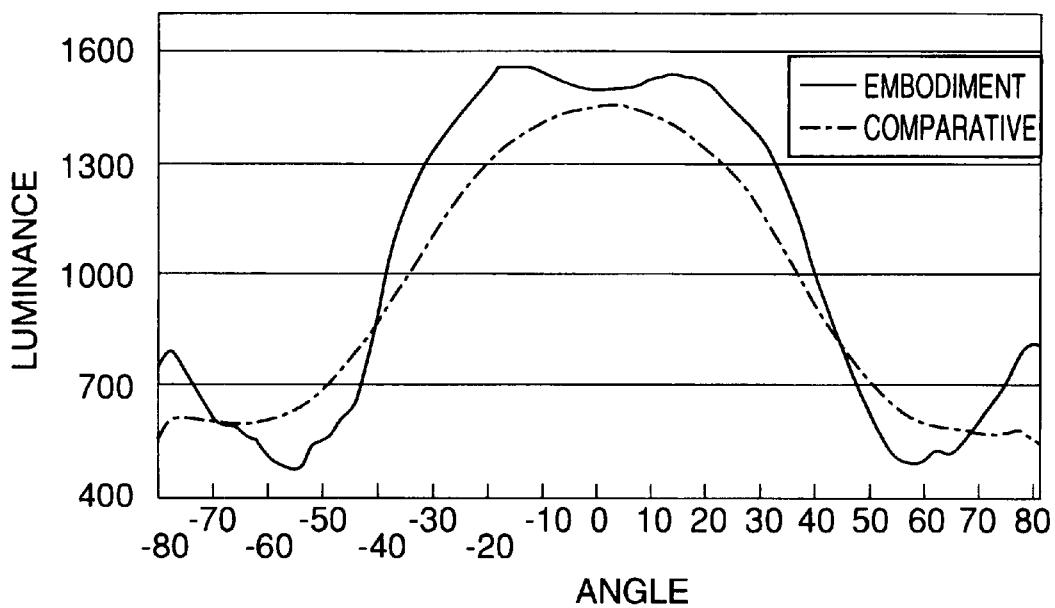
FIG. 7A is a graph showing measured luminous intensity distribution with respect to a direction perpendicular to the lamps.
Figure 7B:
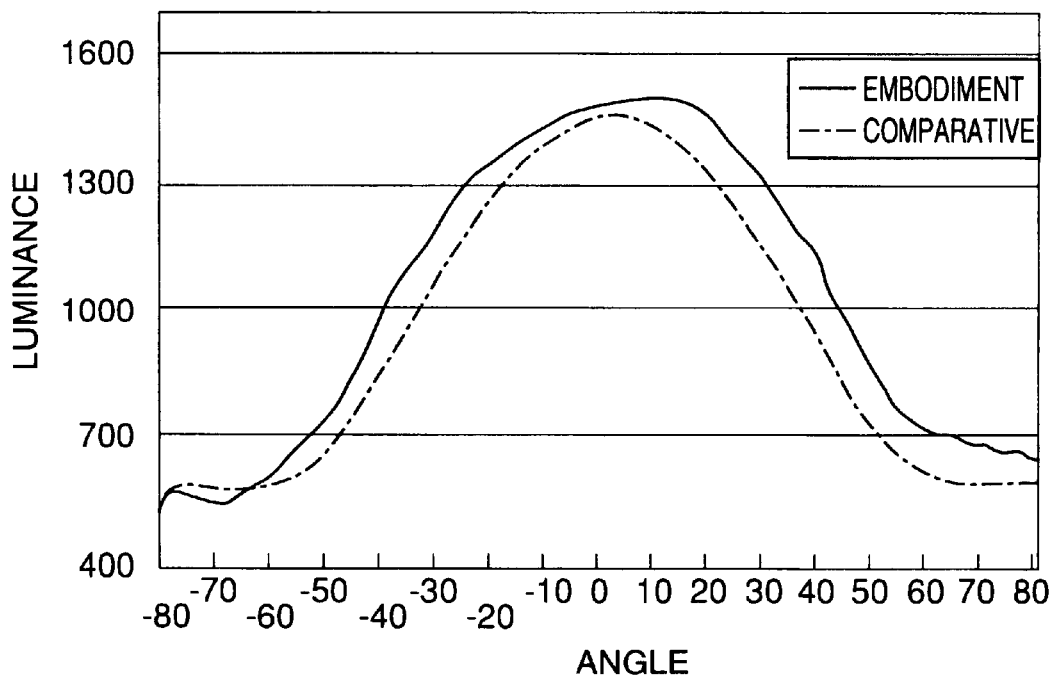
FIG. 7B is a graph showing measured luminous intensity distribution with respect to a direction parallel to the lamps.

FIG. 7A is a graph showing the luminous intensity distribution characteristics with respect to the vertical direction perpendicular to the lamps, and FIG. 7B is a graph showing the luminous intensity distribution characteristics with respect to the horizontal direction parallel to the lamps.

As shown in FIG. 7A, the luminance of the surface light source unit 20 of the embodiment with respect to the vertical direction is higher than that of the comparative example in the range of ±40° with respect to the front (axial) direction (0° direction).

As shown in FIG. 7B, the luminance of the surface light source unit 20 of the embodiment with respect to the horizontal direction is higher than that of the comparative example in substantially all the angular range.

As described above, the embodiment can achieve a high light diffusing efficiency and can diffuse light directionally such that luminous intensity (density) is high in a necessary range. Thus, the surface light source unit provided with directional diffusing films the number of which smaller than that of the conventional surface light source unit can have a luminous intensity in a necessary range higher and evener than that of the conventional surface light source unit.

Accordingly, a liquid crystal display employing the surface light source unit can be formed in a thickness smaller than that of the conventional liquid crystal display while capable of displaying clear images or the like. In addition, the liquid crystal display can be manufactured at a lower cost and be purchased at a lower price, compared with the conventional liquid crystal display.

Modifications

The present invention is not limited to the foregoing embodiments specifically described above, and many changes and variations may be made therein without departing from the scope of the invention.

(1) Although the surface light source unit 20 in the foregoing embodiment is provided with the two directional diffusing films 10, a surface light source unit according to the present invention may be provided with a single directional diffusing film or three or more directional diffusing films.

(2) Although the surface light source unit 20 in the foregoing embodiment is provided with the two directional diffusing films 10 above the light guide plate 22, a polarizing-separating film may be used in combination with the surface light source unit 20.

(3) Although the directionality-providing elements 12 of the foregoing embodiment have a shape that can be traced by moving a shape of successive isosceles triangles along the substantially sinusoidal waveform, the convex directionality-providing elements may have a shape that can be traced by moving a shape of successive isosceles triangles along a shape of successive isosceles triangles.

(4) Although the directional diffusing films 10A and 10B are disposed in such a manner that the four sides of each bottom of the directionality-providing elements 12 thereof extend at the angle of about 4° respectively with respect to the vertical direction and the horizontal direction, the directional diffusing films 10A and 10B may be disposed in such a manner that the four sides of each bottom of the directionality-providing elements 12 thereof extend in parallel to the vertical direction or the horizontal direction.

(5) Although all the convex directionality-providing elements 12 of the foregoing embodiment have the same size, light diffusing mode may be freely changed by forming different types of directionality-providing elements. For example, directionality-providing elements 12 farther from the light source 21 may be formed in sizes greater or smaller than those of the directionality-providing elements 12 nearer to the light source 21.

(6) Although the bottoms of the directional diffusing pats 12 of the foregoing embodiment are substantially square, the bottoms of the same may be rhombic or the lengths L1 and L2 may be different from each other.

What is claimed is:

1. A directional diffusing film comprising:

a base film, and a plurality of convex directionality-providing elements regularly arranged on at least one surface of the base film;

wherein a section of a first directionality-providing element in a first plane including a top of the directionality-providing element has a substantially triangular shape, and a section of the directionality-providing element in a second plane including the top of the directionality-providing element and perpendicular to the first plane has a top of a second directionality-providing element and a shape of a continuous wave.

2. A directional diffusing film according to claim 1, wherein the shape of the continuous wave is a periodic waveform having a period corresponding to each of the first and second directionality-providing elements.

3. A directional diffusing film according to claim 2, wherein the periodic waveform is a substantially sinusoidal waveform.

4. A directional diffusing film according to claim 1, wherein the shape of the continuous wave is a periodic waveform having wavy parts corresponding to the directionality-providing elements and straight parts respectively extending between the adjacent wavy parts.

5. A directional diffusing film according to claim 1, wherein the section of the first directionality-providing element in the first plane has a substantially isosceles triangular shape.

6. A directional diffusing film according to claim 1, wherein the substantially triangular shape has a vertex angle of a range of 80° to 100°.

7. A directional diffusing film according to claim 1, wherein the substantially triangular shape has a vertex which is rounded and/or a predetermined amount of which is cut off.

8. A directional diffusing film according to claim 1, wherein the plurality of convex directionality-providing elements are arranged on a light emitting surface of the base film so that incident light falling on the directional diffusing film at incident angles in a range of 70° to 80° leaves the directional diffusing film at outgoing angles including a maximum outgoing angle in a range of 25° to 40°.

9. A directional diffusing film according to claim 1 wherein the plurality of convex directionality-providing elements are arranged on a light emitting surface of the base film so that a haze value is in a range of 70 to 90 when light falls on a light receiving surface of the base film.

10. A surface light source unit comprising:

a light source, a surface light emitting means having a light-emitting surface that can emit a light from the light source in a predetermined direction, and a directional diffusing film that includes a base film, and a plurality of convex directionality-providing elements regularly arranged on at least one surface of the base film, wherein a section of a first directionality-providing element in a first plane including a top of the directionality-providing element has a substantially triangular shape, and a section of the directionality-providing element in a second plane including the top of the directionality-providing element and perpendicular to the first plane has a top of a second directionality-providing element and a shape of a continuous wave.

11. A liquid crystal display comprising:

a light source, a surface light emitting means having a light-emitting surface that can emit a light from the light source in a predetermined direction, a directional diffusing film that includes a base film, and a plurality of convex directionality-providing elements regularly arranged on at least one surface of the base film, and a transparent liquid-crystal element arranged on a light-emitting side of the directional diffusing film, wherein a section of a first directionality-providing element in a first plane including a top of the directionality-providing element has a substantially triangular shape, and a section of the directionality-providing element in a second plane including the top of the directionality-providing element and perpendicular to the first plane has a top of a second directionality-providing element and a shape of a continuous wave.

* * * * *